United States Patent
Vlahos

(10) Patent No.: US 7,111,940 B2
(45) Date of Patent: Sep. 26, 2006

(54) BACKGROUND IMAGE CONTROL BY PRESENTER POSITION

(75) Inventor: Paul Vlahos, Tarzana, CA (US)

(73) Assignee: Imatte, Inc., Chatsworth, CA (US)

( * ) Notice: Subject to any disclaimer, the term of this patent is extended or adjusted under 35 U.S.C. 154(b) by 201 days.

(21) Appl. No.: 10/861,599

(22) Filed: Jun. 4, 2004

(65) Prior Publication Data

US 2005/0270492 A1    Dec. 8, 2005

(51) Int. Cl.
*G03B 21/26* (2006.01)
*G03B 21/00* (2006.01)

(52) U.S. Cl. ........................................ 353/28; 353/122

(58) Field of Classification Search .................. 353/30, 353/28, 97, 121, 122; 348/169, 239, 577, 348/584, 586, 587, 590, 591, 598, 607, 744; 382/162, 163, 167, 173, 174; 345/114, 167, 345/632, 640; 356/621
See application file for complete search history.

(56) References Cited

U.S. PATENT DOCUMENTS 6,984,039 B1 *   1/2006   Agostinelli .................. 353/28

* cited by examiner

*Primary Examiner*—W. B. Perkey
*Assistant Examiner*—Rochelle Blackman
(74) *Attorney, Agent, or Firm*—Blakely Sokoloff Taylor & Zafman

(57) ABSTRACT

A method for displaying a series of images on a projection screen as a function of a position of a presenter in front of the projection screen. First, the width of the screen is divided into a number of segments of selected widths. The positions of each of the segments is stored in a memory. The position of the presenter is compared with the stored segments to identify the segment currently occupied by the presenter. An image control signal is generated when the presenter changes position from a first segment to a second segment

17 Claims, 1 Drawing Sheet

MANY SCREEN SEGMENTS

FEW SCREEN SEGMENTS

BACKGROUND IMAGE CONTROL BY PRESENTER POSITION

BACKGROUND

Presentations to an audience are frequently made with the assistance of images projected onto a front or rear projection screen. With either type of screen it is necessary at an appropriate time for the presenter to change to the next image. Buttons on a computer keyboard are designated to advance a frame or to back up a frame. A presenter may use an off-stage assistant that brings up the next image frame at his signal, or spoken request, "Next slide please".

Effort has been made to eliminate the keyboard, verbal request, hand signals and gestures. Cordless remote controls can be used to advance to the next image, or return to the previously projected image. In applications where image changes occur rapidly (near real time) it is not practical to use a remote control for switching to the next image.

As a means of increasing alert attention and holding the interest of an audience, iSkia™, a device produced by iMatte Inc. U.S. Pat. No. 6,361,173, selectively inhibits the projected image in the silhouette area of a presenter. The presenter may then come out from behind the podium and walk out in front of the screen. He may look directly at his audience without being blinded by the projector. He may walk across the stage in front of the screen and point directly to elements in the projected image.

The above invention generates a matte silhouette of the presenter for identifying those pixels to inhibit. This matte can also be used to locate the presenter's screen position. A change in the presenter's position with respect to the display screen, from a first position to a second position may be used to generate a control signal.

BRIEF SUMMARY OF THE INVENTION

The distance across a screen, occupied by a displayed image, is divided into segments of selected widths. A presenter crossing from one segment to another, and the direction of crossing, is used to develop a control signal that selects the next image for projection. The change in distance as a presenter walks from the face of the screen toward his audience generates an independent control signal that may be used to dim or defocus the displayed image.

DETAILED DESCRIPTION OF THE INVENTION

The basic concept of this invention is the use of changes in a presenter's physical position, in front of a displayed image, to generate a control signal for selecting the next image to be projected or to effect a change in the projected image. This concept has a number of applications. Three such applications are described below to illustrate how this invention may be applied to control the change from one screen image to another, or to alter a current projected image. These applications require knowledge of the presenter's position with respect to the display screen, which can be determined by various types of range finders. Examples of suitable range finders for this application include those used in cameras. Their range finder operates motors to drive the camera lens to the point of best focus for the distance of the subject. These same motors can generate signals which can be connected to the computer and calibrated for distance.

Figure 1:
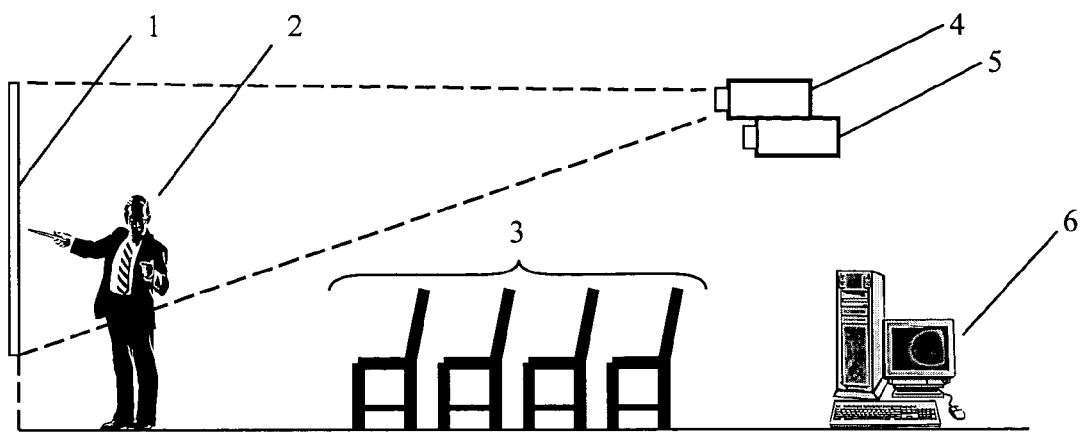
FIG. 1 illustrates the projection of an image onto a front projection screen and the elements needed to generate a switching signal.

FIG. 1 is an illustration of a front projection screen 1, a presenter 2 standing in front of screen 1, audience area 3, image projector 4, projected image selective inhibitor 5, and memory 6. Projector 4 is an electronic projector receiving its images from memory 6.

Projected image selective inhibitor 5 includes an infrared projector and camera to generate a matte, a black silhouette of the presenter. This matte connected to projector 4 inhibits (to near zero) the signal level of all pixels within the silhouette area of the presenter. This silhouette provides the position of the presenter with respect to the projection screen at all times.

The distance across that part of the screen occupied by the projected image is divided into a number of contiguous segments of selected width as shown in figures two and three. Normally the projected image fills the projection screen. The x-axis start and end (or width) of each segment are stored in a memory. The number of segments is determined by the application. The more that smooth, real time changes in the displayed image are required, the more segments are required.

There is little difficulty in locating the screen segment occupied by the presenter when there are only a few large segments. For example, when more than half of the silhouette pixels are in a given segment, the subject is considered to be in that segment. To prevent chatter (indecision) the number of pixels in a given segment must exceed 50% by a selected margin.

However, when there are a few hundred closely spaced segments, it becomes necessary to represent the presenter by a single X axis address. The availability of the presenter's silhouette which is generated by projected image selective inhibitor 5 permits calculation of the silhouette's centroid, a point often referred to as the center of mass. This point is then used to represent the presenter's position. A comparison of the presenter's position with that of the stored screen segments will identify the segment occupied by the presenter.

Figure 2:
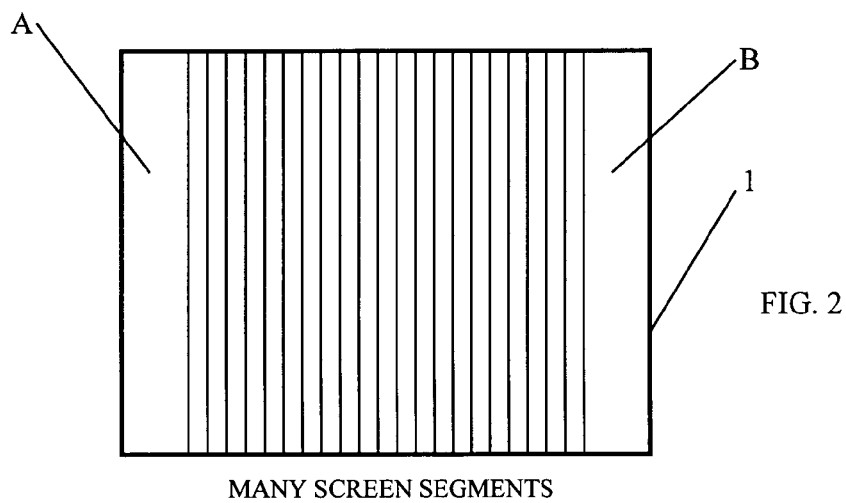
FIG. 2 is an illustration of an image of a projection screen divided into many small segments with a wide segment at each end.

The use of many screen segments permits a presenter to show, for example, the front end of an automobile when the presenter begins in screen segment A in FIG. 2. As the presenter walks across the stage toward segment B, imaging software, using the presenter's segment position results in the car appearing to turn slowly until at segment B the rear of the car is seen. The presenter may stop at any time to discuss a particular feature, such as a keyless lock along the window edge of the driver's door. When the presenter stops his motion across the screen, the image progression also stops. In effect, the presenter is functioning as a pointing device where what is displayed is a function of the current position of the pointer, i.e., presenter.

Segment A is a single screen segment at one edge of the screen that a presenter may occupy before beginning his presentation. Segment B at the opposite edge serves a similar purpose.

In this application enough image frames are stored (about 300) to provide flicker-free motion of the turning automobile when the presenter walks across the stage in front of the screen.

A presenter beginning his presentation in segment A also begins with image # 1. There is no need to identify an individual image frame with an individual screen segment. However, each screen segment may be numbered as well as each image in a sequence. Thus when the presenter already occupies a given screen segment other than A or B, a specific image of matching number will be projected.

Arming and Disarming

Figure 3:
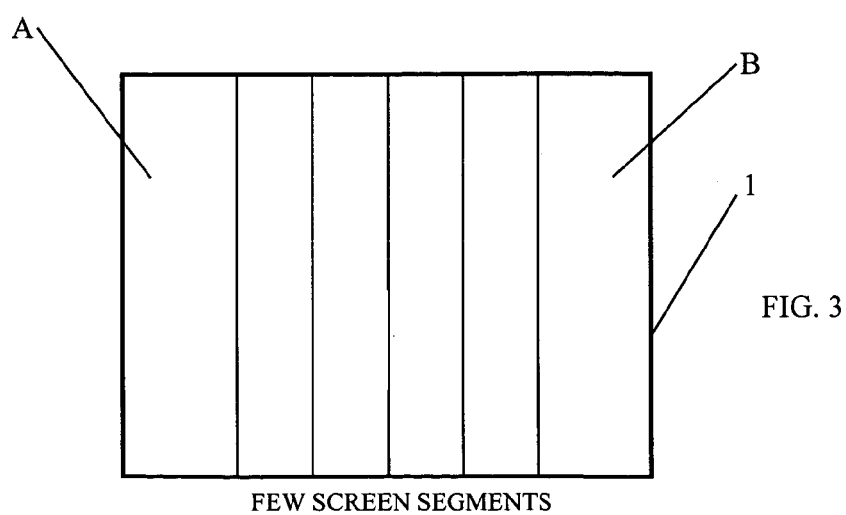
FIG. 3 is an image of a projection screen divided into a small number of segments with a wide segment at each end.

FIG. 3 is an example of an image of a projection screen divided into six segments and is suitable for a presenter who discusses each image before changing to the next image. In this application the presenter may arm and disarm the switching function to permit the presenter a wide range of motion across the screen without causing an image change. His entry into segment A or B may be used to arm or disarm the image switch function. Several unique control functions can be derived from a small number of screen segments by using the direction of detected segment boundary crossings.

The Z Axis

The development of a control signal in the above examples involves a presenter walking on the floor across the front of a display screen. In these two applications the presenter remains fairly close to the screen to be able to identify items in the projected image. However, the presenter may also turn and walk away from the screen toward his audience. In this case, a range finder keeping track of the presenter's distance from the screen permits the generation of an independent control signal. This control signal can be used (for example) to defocus or to darken the projected image thereby encouraging the audience to pay attention to the presenter as he moves toward them.

The return of the presenter towards the projected image generates a signal that can be used to undo the effort created on his walk off from the screen toward the audience. However, his return to the screen could be used to advance the projector to the next image.

The determination of the distance of a presenter from the screen can be obtained by any one of several range finding techniques. This Z axis position can also be derived from the silhouette provided by projected image selective inhibitor 5 as follows. The detection of the presenter's silhouette area is achieved by observing a displacement of a projected pattern by an offset camera. This displacement is proportional to the separation of an object from the face of the screen. Pattern separation may be calibrated in terms of subject distance from screen surface.

The presenter's change of position on the Z axis becomes a second control signal and is independent of the X axis control signal. Since the presenter's change of position is under his control, the amount or degree of out of focus or darkening is under his control, and may be linear if desired.

Finding applications is not the purpose of this invention. The above examples are given to demonstrate the utility of using a change in the presenter's position for controlling some aspect of the displayed image.

Implementation

The position of a presenter along the X axis of a projection screen may be located by a range finder near one edge of the projection screen. Whether one uses a range finder or the centroid of a silhouette produced by projected image selective inhibitor 5, both will provide an acceptable approximation of the presenter's X-axis position.

In two of the applications described earlier, one utilized about 300 relatively narrow screen segments while the second utilized only six relatively wide screen segments. Each new application for using a presenter's position to generate an image control signal will require a unique number and spacing of distance segments. The number of required segments and their spacing depends on each application and the use to be made of the generated control signal. In most applications, it is important for the presenter to enter from an off-screen position to a position before the screen, without small motions triggering an image change. A wide segment at one or both ends of the screen is a simple way to achieve this objective.

In the case of the independent control signal generated by a presenters change in his distance from the screen, this signal is easily made binary by selecting a distance from the screen as a switching point. However, the control signal may be fully proportional to the presenter's distance from the screen.

The invention claimed is:

1. A method for displaying a series of images on a projection screen as a function of a position of a presenter in front of said projection screen comprising the steps of:
    a) dividing the width of the screen into a number of segments of selected widths and storing the positions of each of said segments in a memory,
    b) comparing the position of said presenter with said stored segments to identify the segment currently occupied by said presenter,
    c) generating an image control signal when said presenter changes position from a first segment to a second segment.

2. The method of claim 1 in which said segments are a measure of the distance said presenter has moved away from said screen toward his audience.

3. The method of claim 1 in which said projection screen is one of a front projection screen, a rear projection screen, and a self-luminous display device.

4. The method of claim 1 in which said control signal replaces a first screen image with a second screen image.

5. The method of claim 1 in which the X-axis position of said presenter is represented by the centroid of the presenter's silhouette area.

6. The method of claim 1 in which the X-axis position of said presenter is a point at the approximate center of mass of said presenter as determined by an off-screen range finder.

7. The method of claim 1 in which said presenter upon entering a predetermined segment inhibits generation of said control signal.

8. The method of claim 1 in which said presenter upon entering a predetermined segment enables generation of said control signal.

9. The method of claim 1 in which a second control signal is generated by a change of said presenter's position toward or away from the face of said screen.

10. A method by which an image on a projection screen is changed when a presenter changes position in front of said screen from a first position to a second position comprising the steps of:
    a) storing in a memory positional identifying information for a plurality of segments, each segment having a designated position on said screen,
    b) comparing the position of said presenter with said positional identifying information to identify the segment currently occupied by said presenter, c) enabling said image change when said presenter has moved from a current segment to an adjacent segment.

11. The method of claim 10 in which said designated position is a segment positioned at one of a left edge and a right edge of said screen.

12. The method of claim 10 in which said image change is a change to a next image in a series of images or to a previous image in said series of images as the presenter moves along the face of said screen from said current segment to said adjacent segment.

13. The method of claim 10 in which said designated position on said screen is the screen face when said presenter moves from a position near the screen toward an audience.

14. The method of claim 10 in which said projected screen image is dimmed, defocused, or otherwise modified as the presenter walks from a position near the screen toward an audience.

15. The method of claim 14 in which a return of said presenter from a position near said audience toward the screen is an independent control function and used to do one of undo the previous change and call up a new image.

16. The method of claim 10 in which said determination of the position of said presenter with respect to a designated position on said screen is obtained using a range finding device.

17. The method of claim 10 in which said projection screen is one of a front projection screen, a rear projection screen, a self luminous screen, a plasma screen, and a screen comprising light emitting polymers.

* * * * *